US008763743B2

(12) United States Patent
Nitawaki

(10) Patent No.: US 8,763,743 B2
(45) Date of Patent: Jul. 1, 2014

(54) BATTERY PACK MOUNTING STRUCTURE FOR ELECTRIC VEHICLE

(71) Applicant: Suzuki Motor Corporation, Hamamatsu (JP)

(72) Inventor: Kunihiro Nitawaki, Hamamatsu (JP)

(73) Assignee: Suzuki Motor Corporation, Hamamatsu-Shi (JP)

( * ) Notice: Subject to any disclaimer, the term of this patent is extended or adjusted under 35 U.S.C. 154(b) by 0 days.

(21) Appl. No.: 13/902,127

(22) Filed: May 24, 2013

(65) Prior Publication Data

US 2013/0319780 A1 Dec. 5, 2013

(30) Foreign Application Priority Data

Jun. 5, 2012 (JP) ................. 2012-127813

(51) Int. Cl.
*B60R 16/04* (2006.01)
*B60K 1/04* (2006.01)

(52) U.S. Cl.
CPC . *B60K 1/04* (2013.01); *Y02E 60/12* (2013.01); *B60K 2001/0438* (2013.01); *B60K 2001/0416* (2013.01); *Y10S 903/907* (2013.01)
USPC ........................................ 180/68.5; 903/907

(58) Field of Classification Search
CPC ................. B60K 1/04; B60K 2001/04; B60K 2001/0416; B60K 2001/0433; B60K 2001/0438; B60S 5/06
USPC ....................... 180/68.5, 65.1; 903/903, 907
See application file for complete search history.

(56) References Cited

U.S. PATENT DOCUMENTS

| 6,988,575 | B2 * | 1/2006 | Takedomi et al. | 180/68.5 |
| 7,654,351 | B2 * | 2/2010 | Koike et al. | 180/68.5 |
| 8,146,694 | B2 * | 4/2012 | Hamidi | 180/68.5 |
| 8,584,779 | B2 * | 11/2013 | Tsuchiya et al. | 180/68.5 |

FOREIGN PATENT DOCUMENTS

JP 2008-226610 9/2008

* cited by examiner

*Primary Examiner* — John Walters
(74) *Attorney, Agent, or Firm* — Stein IP, LLC

(57) ABSTRACT

There is provided a battery pack mounting structure for an electric vehicle. A battery pack is mounted in a space behind a rear seat of the electric vehicle. Battery modules are accommodated in the battery back are in a stacked state in a height direction of the electric vehicle. A floor panel behind the rear seat is formed with an opening into which an upper part of the battery pack is inserted. When seen from a side of the electric vehicle, a dimension of one battery module disposed at a position protruding upwards from the opening, is smaller in the longitudinal direction than that of another battery module disposed below the one battery module, and a front end portion of the one battery module is offset towards a rear side of the electric vehicle relative to that of the another battery module.

3 Claims, 3 Drawing Sheets

UPPER

FRONT

UPPER

FRONT

BATTERY PACK MOUNTING STRUCTURE FOR ELECTRIC VEHICLE

CROSS-REFERENCE TO RELATED APPLICATIONS

This application claims the benefit of Japanese Application No. 2012-127813, filed Jun. 5, 2012, in the Japanese Intellectual Property Office, the disclosures of which are incorporated herein by reference.

BACKGROUND OF THE INVENTION

1. Field of the Invention

The present invention relates to a battery pack mounting structure for an electric vehicle, and more particularly, to a battery pack mounting structure for an electric vehicle capable of increasing the number of battery modules to be mounted on a vehicle in which a battery pack accommodating the battery modules therein is arranged in a space behind a rear seat without lowering the rigidity of a rear part of the vehicle.

2. Description of the Related Art

In an electric vehicle including a hybrid electric vehicle, a secondary battery is mounted on a vehicle and the vehicle can travel with a driving motor. The maximum traveling distance of the electric vehicle with the motor depends on a battery capacity. Therefore, in order to reduce the amount of the exhaust gas, it is preferable to increase the battery capacity of the secondary battery mounted on a vehicle as much as possible.

Patent Document 1: JP-A-2008-226610

In a hybrid electric vehicle or range extended electric vehicle as related-art electric vehicles, a fuel tank for a motor and an exhaust pipe are disposed below a vehicle interior. Therefore, it is not possible to make a space below the vehicle interior for mounting a large-sized battery pack therein. Consequently, there is a problem that the battery capacity is limited. To solve this problem, the battery pack may be disposed a space behind a rear seat. However, since it is necessary to make a shock absorption space behind the battery pack, there still remains a problem that it is difficult to ensure the sufficient amount of the battery capacity. If the large-sized battery pack is mounted in the vehicle interior, it is difficult to attach and detach the battery pack to and from the vehicle, so that the maintenance capability on a market would be considerably deteriorated. If a frame of a vehicle body is partially cut out to make a space for mounting the large-sized battery pack, the rigidity of the vehicle body would be lowered.

SUMMARY OF THE INVENTION

It is therefore an object of the present invention to increase the number of battery modules to be mounted on a vehicle in which a battery pack accommodating the battery modules therein is arranged in a space behind a rear seat without lowering the rigidity of a rear part of the vehicle.

Accordingly, in order to achieve the above object, according to an aspect of the embodiments of the present invention, there is provided a battery pack mounting structure for an electric vehicle, comprising: a battery pack mounted in a space behind a rear seat of the electric vehicle; a plurality of battery modules accommodated in the battery back in a stacked state in an height direction of the electric vehicle; and a plurality of batteries arranged in a longitudinal direction of the electric vehicle in each of the plurality of battery modules, wherein a floor panel behind the rear seat is formed with an opening into which an upper part of the battery pack is inserted, and wherein when the battery pack is seen from a side of the electric vehicle, a dimension of one of the battery modules, which is disposed at a position protruding upwards from the opening, is smaller in the longitudinal direction of the electric vehicle than a dimension of another of the battery modules, which is disposed below the one of the battery modules, and a front end portion of the one of the battery modules is offset towards a rear side of the electric vehicle relative to a front end portion of the another of the battery modules.

According to the aspect of the embodiments of the present invention, since the floor panel behind the rear seat is formed with the opening into which the upper part of the battery pack is inserted, it is possible to increase the number of the battery modules that can be mounted in the height direction of the electric vehicle, as compared with a structure where the battery pack is disposed only below the floor panel. Also, according to the aspect of the present invention, since the dimension of one of the battery modules, which is disposed at the position protruding upwards from the opening, is smaller in the longitudinal direction of the electric vehicle than the dimension of another of the battery modules, which is disposed below the one of the battery modules, and a front end portion of the one of the battery modules is offset towards a rear side of the electric vehicle relative to a front end portion of the another of the battery modules, it is possible to decrease a size of the opening as much as possible, thereby preventing the rigidity of a rear part of the electric vehicle from being lowered. Thus, it is not necessary to significantly reinforce a vehicle body structure upon the mounting of the battery pack. In addition, according to the aspect of the embodiments of the present invention, since it is possible to attach and detach the battery pack to and from the vehicle from below the floor panel, the maintenance capability of the battery module can be improved, as compared with a structure in which the battery modules are disposed on the upper side of the floor panel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

In the accompanying drawings.

DETAILED DESCRIPTION OF THE EMBODIMENTS

Figure 1:
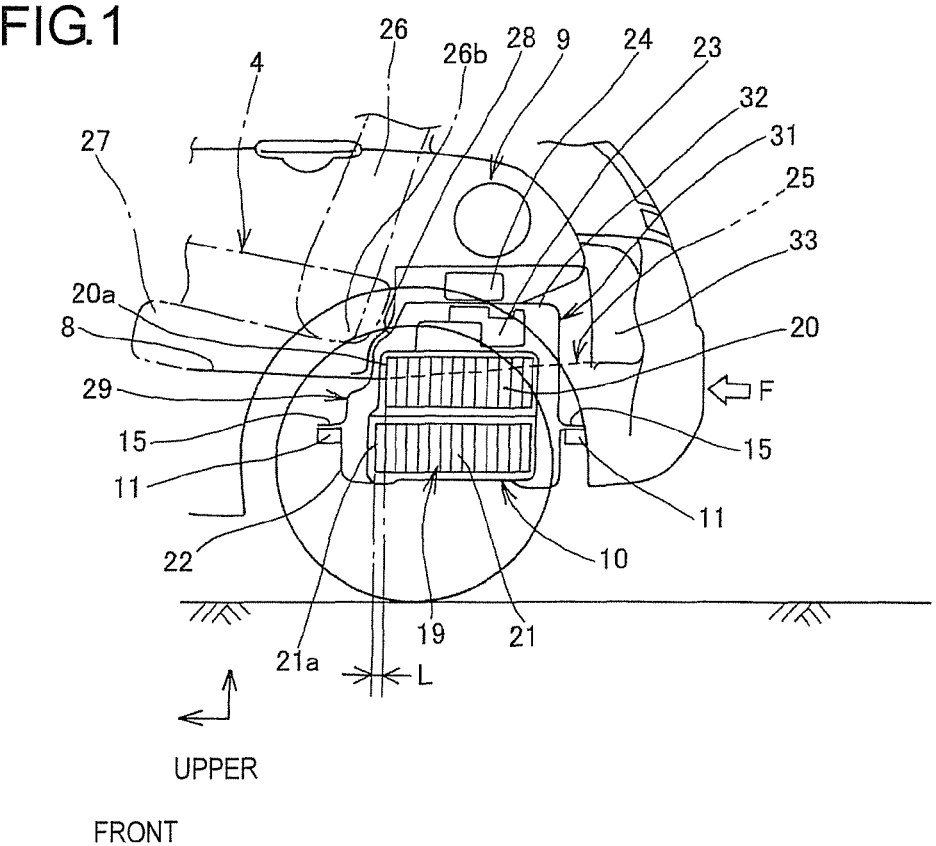
FIG. 1 is an enlarged view of a rear part of a vehicle according to an exemplary embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
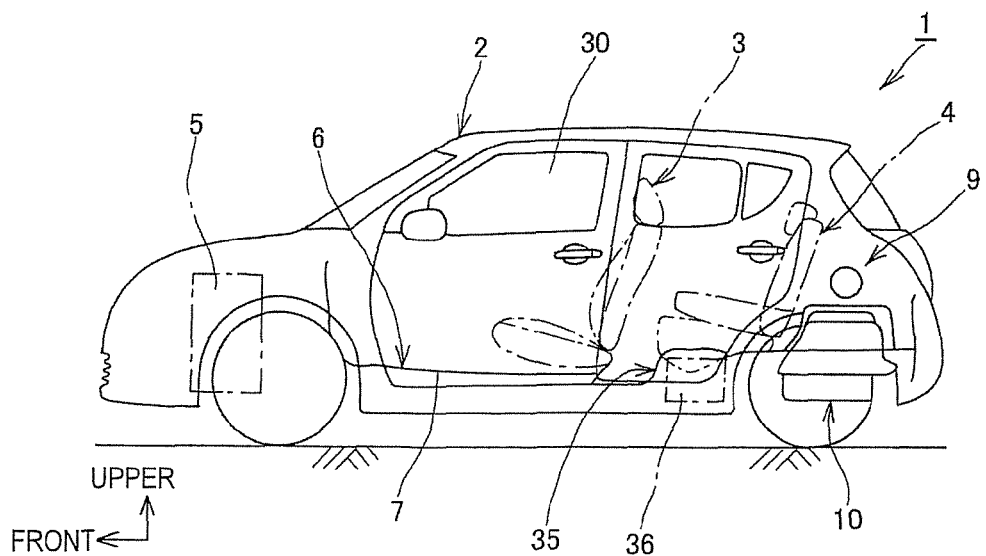
FIG. 2 is a schematic side view of the vehicle.
Figure 3:
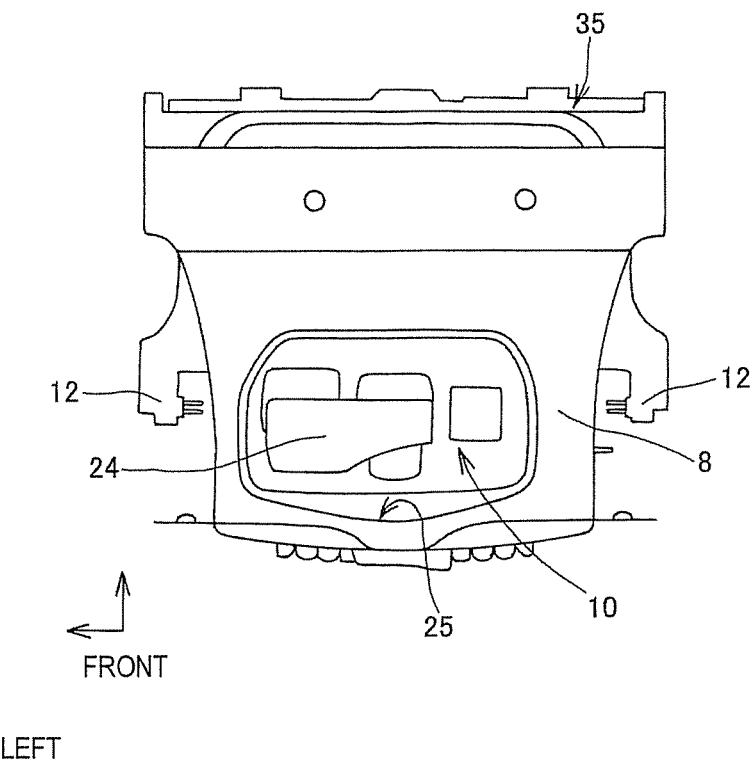
FIG. 3 is a plan view of the rear part of the vehicle.
Figure 4:
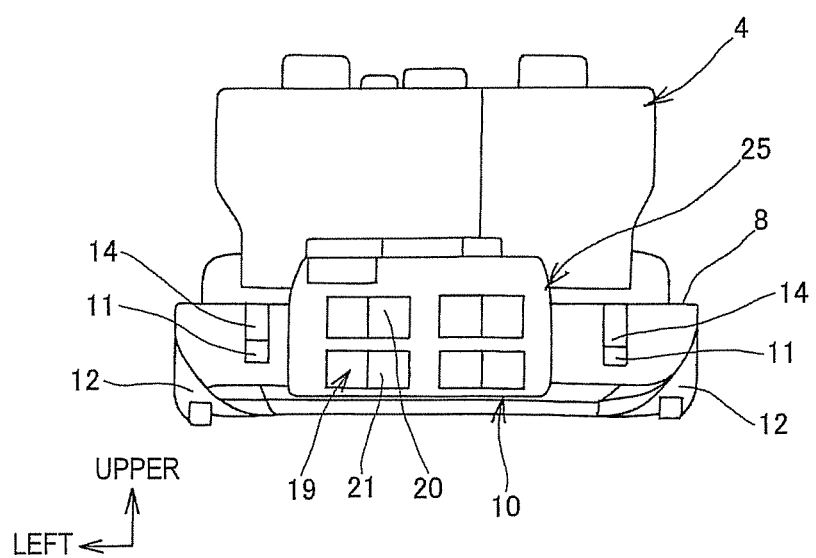
FIG. 4 is a schematic view of the rear part of the vehicle when seen from behind.
Figure 5:
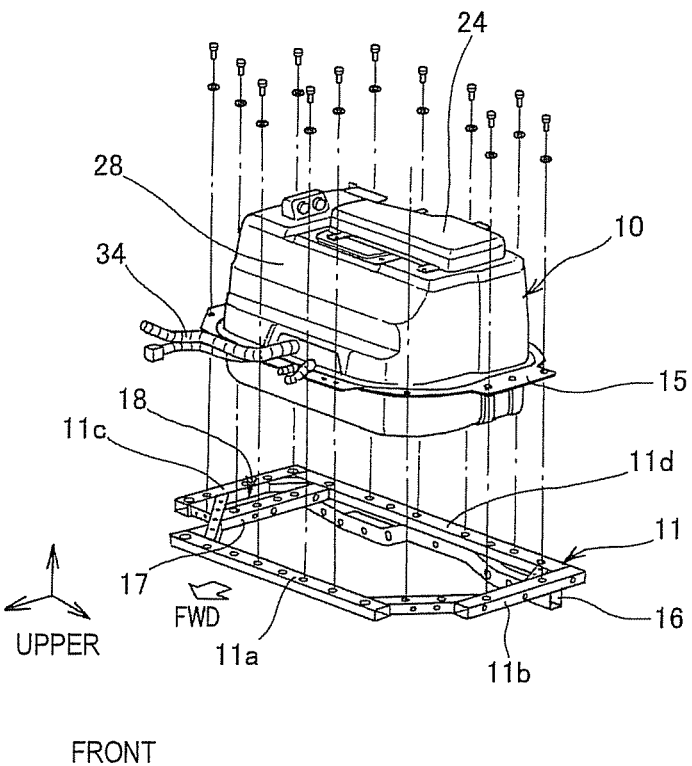
FIG. 5 is a perspective view of a battery pack according to the exemplary embodiment.
Figure 6:
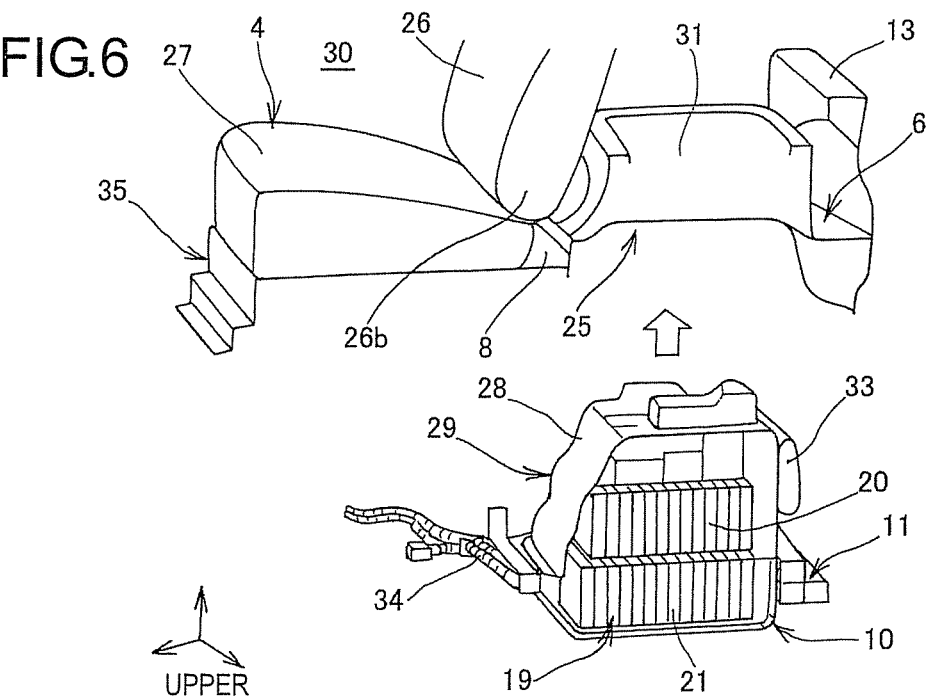
FIG. 6 is a cross-sectional perspective view of the rear part of the vehicle and the battery pack.

Hereinafter, an exemplary embodiment of the present invention will be described with reference to the drawings. FIGS. 1 to 6 illustrates an exemplary embodiment of the present invention. As shown in FIG. 2, an electric vehicle 1 (including a hybrid electric vehicle) includes a vehicle body 2, a front seat 3 and a rear seat 4. In the electric vehicle 1, an engine 5 for power generation is mounted in a front part of the vehicle and a floor panel 6 is disposed below a vehicle interior (a passenger compartment). The floor panel 6 has a front floor 7 that extends from a lower part of the front seat 3 to a front part of the rear seat 4 and a rear floor 8 that is connected to the front floor 7 through a step part and extends towards a rear part of the vehicle through a lower part of the rear seat 4. As shown in FIG. 4, side members 14 that extend in a longitudinal direction of the vehicle are disposed at both side portions of the vehicle in a width direction of the vehicle and at a side of a lower surface of the rear floor 8. Suspension beams 12 provided with a pair of arm parts for supporting rear wheels (not shown) at both side portions of the vehicle in the width direction of the vehicle are disposed below the side members 14. The electric vehicle 1 is mounted with a battery pack 10 in a space 9 behind the rear seat 4. As shown in FIGS. 1 and 3 to 6, the battery pack 10 is disposed in a space surrounded by the suspension beams 12 and is attached to lower sides of the side members 14 through a sub-frame 11 having a circular shape. As shown in FIGS. 1, 5 and 6, the battery pack 10 has a flange part 15 and the flange part 15 is put on the sub-frame 11. The battery pack 10 is configured to be attached and detached to and from the vehicle from below the rear floor 8. As shown in FIGS. 1, 3 and 6, the floor panel 6 is formed with an opening 25 and an upper part of the battery pack 10 is inserted into the opening 25 when the battery pack 10 is attached to the vehicle. As shown in FIG. 5, the sub-frame 11 has a front member part 11a, a left member part 11b, a right member part 11c and a rear member part 11d. The front member part 11a has a linear portion extending in the width direction of the vehicle, a left corner portion inclined outward and rearward from a left side end portion of the linear portion and a right corner portion that extends rearward from a right side end portion of the linear portion. A front end of the left member part 11b is continued from a rear end of the left corner portion of the front member part 11a and a rear end of the left member part 11b extends rearward. A front end of the right member part 11c is continued from a rear end of the right corner portion of the front member part 11a and a rear end of the right member part 11c extends rearward. Each of the rear ends of the left member part 11b and right member part 11c continue to the rear member part 11d, so that the front member part 11a, the left member part 11b, the right member part 11c and the rear member part 11d constitute the sub-frame 11 which is a frame body for support. A reinforcement member 16 is disposed at a lower side of the rear member part 11d along the rear member part 11d. A right bracket 17 that connects the front member part 11a and the rear member part 11d is provided at an inside of the right member part 11c. A space 18 is formed between the right member part 11c and the right bracket 17 in a right side part of the sub-frame 11.

A plurality of battery modules 19 are accommodated in the battery pack 10 in a stacked state in the height direction of the vehicle. A plurality of batteries are arranged in the longitudinal direction of the vehicle in each of the battery modules 19. As shown in FIG. 1, the battery pack 10 has a two-layered structure which is comprised of upper battery modules 20 which are inserted into the opening 25 and lower battery modules 21 which are disposed below the upper battery modules 20. The battery pack 10 has a housing 22 which is comprised of an upper housing and a lower housing and accommodates therein the other electric component 23 and a cooling device (not shown) as well as the upper battery modules 20 and the lower battery modules 21. The cooling device has an air cleaner 24 on the battery pack 10 to cool the battery pack 10 with air sucked through the air cleaner 24 (refer to FIGS. 1, 3 and 5). The cooling device discharges the air used for the cooling to the outside through an exhaust duct 33 disposed at a rear side of the battery pack 10 (refer to FIG. 6).

In the electric vehicle 1, the opening 25 into which the upper part of the battery pack 10 is inserted is formed on the floor panel 6 behind the rear seat 4, i.e., on the rear floor 8. When the battery pack 10 is seen from a side of the vehicle, a dimension of one of the battery modules 19 which is disposed at a position protruding upwards from the opening 25, is smaller in the longitudinal direction of the vehicle than a dimension of another of the battery modules 19, which is disposed below the one of the battery modules 19, and a front end portion of the one of the battery modules 19 is offset towards a rear side of the vehicle relative to a front end portion of the another of the battery modules 19. Specifically, as shown in FIG. 1, when the battery pack 10 is seen from the side of the vehicle, a dimension of the upper battery module 20 in the longitudinal direction of the vehicle, which is disposed at a position protruding upwards from the opening 25 is smaller than a dimension of the lower battery module 21 in the longitudinal direction of the vehicle, which is disposed below the upper battery module 20. When the battery pack 10 is seen from the side of the vehicle, a front end portion 20a of the upper battery module 20 is offset towards the rear side of the vehicle by a dimension L relative to a front end portion 21a of the lower battery module 21.

The rear seat 4 is disposed in front of the battery pack 10. The rear seat 10 is provided with a seatback 26 which is configured be folded towards a front side of the vehicle. As shown in FIG. 1, the rear seat 4 is comprised of a cushion part 27 on which a passenger sits and the seatback 26 arranged at a rear end portion of the cushion part 27 and configured to be folded towards the front side of the vehicle. A front wall part 29 of the battery pack 10 is formed with a recess portion 28 along a movement path in which a lower edge portion 26b of the seatback 26 moves when folding the seatback 26 of the rear seat 4. As shown in FIGS. 1 and 6, the battery pack 10 is provided with the housing 22 that covers the upper battery modules 20, the lower battery module 21 and the like, and the recess portion 28 is formed on the front wall part 29 of the housing 22 at the front side of the vehicle.

A pedestal-shaped cover panel 31 is attached to the opening 25 so that the pedestal-shaped cover panel 31 projects towards the vehicle interior 30 beyond the floor panel 6. The upper part of the battery pack 10 is disposed in the cover panel 31. That is, the cover panel 31 which is formed into a pedestal-shape is attached so as to cover the opening 25 formed on the rear floor 8 which is a part of the floor panel 6 positioned behind the rear seat 4 from the vehicle interior 30. A detachable service lid 32 is provided on an upper part of the cover panel 31. As shown in FIGS. 1 and 6, the upper part of the battery pack 10 is disposed in the cover panel 31. The reference numeral '34' indicates a power line of the battery pack 10. As shown in FIG. 5, the power line 34 is drawn out forward from a lower part below the recess portion 28 which is formed on the front wall part 29 positioned at the front side of the housing 22 of the battery pack 10. The reference numeral '35' indicates a vertical wall part which is formed at a boundary part between the front floor 7 and rear floor 8 of the floor panel 6. A fuel tank 36 is disposed at a position behind the vertical wall part 35.

Next, the operations of this exemplary embodiment will be described.

First, the upper battery module 20 is stacked on the lower battery module 21 to form the battery pack 10. At this time, when the battery pack 10 is seen from the side of the vehicle, a dimension of the upper battery module 20 in the longitudinal direction of the vehicle is made to be smaller than a dimension of the lower battery module 21 in the longitudinal direction of the vehicle, which is positioned below the upper battery module 20 and the front end portion 20a of the upper battery module 20 is made to be offset towards the rear side of the vehicle by a dimension L relative to the front end portion 21a of the lower battery module 21, as shown in FIG. 1.

Before mounting the battery pack 10 on the electric vehicle 1, the flange part 15 of the battery pack 10 is put on the sub-frame 11, as shown in FIG. 5. When mounting the battery pack 10 on the electric vehicle 1, the battery pack 10 and the sub-frame 11 are mounted on the vehicle from below the rear floor 8 which is a part of the floor panel 6 between the left and right arms of the suspension beams 12 at the rear side of the electric vehicle 1, as shown in FIGS. 1 and 6. At this time, the upper part of the battery pack 10 is inserted into the opening 25 formed on the rear floor 8 which is a part of the floor panel 6 behind the rear seat 4, and the sub-frame 11 is attached to the lower sides of a cross member (not shown) and the left and right side members 14. When mounting the battery pack 10 on the electric vehicle 1, an exhaust pipe (not shown) is disposed below the space 18 formed between the right member part 11c and the right bracket 17 at the right part of the sub-frame 11.

In this exemplary embodiment, the opening 25 is formed on the rear floor 8 which is a part of the floor panel 6 behind the rear seat 4 and the upper part of the upper battery module 20 of the battery pack 10 is inserted into the opening 25. Thus, it is possible to increase the number of the battery modules that can be mounted in the height direction of the vehicle, as compared with a structure where the battery modules are disposed only below the rear floor 8. Also, when the battery pack 10 is seen from the side of the vehicle, the dimension of the upper battery module 20 in the longitudinal direction of the vehicle, which is the battery module 19 protruding upwards from the opening 25, is smaller than the dimension of the lower battery module 21 in the longitudinal direction of the vehicle, which is disposed below the upper battery module 20, and the front end portion 20a of the upper battery module 20 is offset towards the rear side of the vehicle by the dimension L relative to the front end portion 21a of the lower battery module 21 which is disposed below the upper battery module 20. Thus, it is possible to decrease a size of the opening 25 as much as possible, thereby preventing the rigidity of the rear part of the vehicle from being lowered. Consequently, it is not necessary to significantly reinforce the vehicle body structure upon the mounting of the battery pack 10. Since it is possible to attach and detach the battery pack 10 to and from the vehicle from below the rear floor 8 which is a part of the floor panel 6, the maintenance capability of the battery module 19 can be improved, as compared with a structure where the battery module 19 is disposed on the upper side of the floor panel 6.

The front wall part 29 of the battery pack 10 is formed with the recess portion 28 along the movement path in which the lower edge portion 26b of the seatback 26 moves when folding the seatback 26 of the rear seat 4. Thus, it is possible to mount the battery pack 10 while bringing the battery pack 10 into close to the rear seat 4 in the longitudinal direction of the vehicle. Therefore, it is possible to secure the space 9 for shock absorption behind the battery pack 10.

The pedestal-shaped cover panel 31 is attached to the opening 25 so that the pedestal-shaped cover panel 31 projects towards the vehicle interior 30 beyond the floor panel 6 and the upper part of the battery pack 10 is disposed in the cover panel 31. Thus, the number of the battery modules 19 to be stacked can be increased only by changing a height of the cover panel 31, if the battery capacity is necessary to be increased.

In the meantime, the present invention is not limited to the above exemplary embodiment and a variety of modifications can be made.

For example, in the above exemplary embodiment, the battery pack is configured to have the two-layered structure of the upper battery module and the lower battery module. However, a special configuration having three or more layers can also be employed. That is, it is possible to easily configure the battery pack to have three-or-more-layered structure by changing the shape of the cover panel which is formed into a pedestal-shape to cover the opening of the rear floor from the side of the vehicle interior as well as an extra space above the battery pack or by changing the shape of the service lid provided at the upper part of the cover panel.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack mounting structure for an electric vehicle, comprising:
    a battery pack mounted in a space behind a rear seat of the electric vehicle;
    a plurality of battery modules accommodated in the battery pack in a stacked state in an height direction of the electric vehicle; and
    a plurality of batteries arranged in a longitudinal direction of the electric vehicle in each of the plurality of battery modules,
    wherein a floor panel behind the rear seat is formed with an opening into which an upper part of the battery pack is inserted, and
    wherein when the battery pack is seen from a side of the electric vehicle, a dimension of one of the battery modules, which is disposed at a position protruding upwards from the opening, is smaller in the longitudinal direction of the electric vehicle than a dimension of another of the battery modules, which is disposed below the one of the battery modules, and a front end portion of the one of the battery modules is offset towards a rear side of the electric vehicle relative to a front end portion of the another of the battery modules.

2. The battery pack mounting structure for the electric vehicle, according to claim 1,
    wherein the rear seat is provided with a seatback configured to be folded towards a front side of the electric vehicle, and
    wherein a front wall part of the battery pack is formed with a recess portion along a movement path in which a lower edge portion of the seatback moves when folding the seatback.

3. The battery pack mounting structure for the electric vehicle according to claim 1, wherein a pedestal-shaped cover panel is attached to the opening so that the pedestal-shaped cover panel projects towards a vehicle interior beyond the floor panel, and
wherein the upper part of the battery pack is disposed in the cover panel.

\* \* \* \* \*